United States Patent
Stamm

(10) Patent No.: US 6,622,298 B1
(45) Date of Patent: Sep. 16, 2003

(54) METHOD AND APPARATUS FOR TESTING SOFTWARE HAVING A USER INTERFACE

(75) Inventor: Reto Stamm, County Tipperary (IE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/497,090

(22) Filed: Feb. 3, 2000

(51) Int. Cl.[7] .............................................. G06F 9/44
(52) U.S. Cl. ...................................... 717/125; 717/126
(58) Field of Search ................................ 717/124–135; 345/965–970, 762; 703/22; 714/33–57, 30–32

(56) References Cited

U.S. PATENT DOCUMENTS

| | | | | |
|---|---|---|---|---|
| 5,513,315 A | * | 4/1996 | Tierney et al. ................. | 714/10 |
| 5,548,718 A | * | 8/1996 | Siegel et al. ................... | 714/38 |
| 5,758,062 A | * | 5/1998 | McMahon et al. ............. | 714/33 |
| 5,819,066 A | * | 10/1998 | Bromberg et al. ........... | 706/920 |
| 5,905,856 A | * | 5/1999 | Ottensooser .................. | 714/38 |
| 6,002,869 A | * | 12/1999 | Hinckley ..................... | 717/124 |
| 6,028,999 A | * | 2/2000 | Pazel .......................... | 717/134 |
| 6,067,639 A | * | 5/2000 | Rodrigues et al. ............ | 714/38 |
| 6,151,686 A | * | 11/2000 | McDonough et al. .......... | 707/3 |
| 6,345,322 B1 | * | 2/2002 | Humphrey ................. | 707/100 |
| 6,418,543 B1 | * | 7/2002 | Goli et al. .................... | 714/38 |

* cited by examiner

Primary Examiner—Tuan Q. Dam
Assistant Examiner—Tuan Anh Vu
(74) Attorney, Agent, or Firm—LeRoy D. Maunu; Lois D. Cartier

(57) ABSTRACT

A method and apparatus for testing software having a user interface are presented in various embodiments. The method generally entails evolving a test sequence by generating random test actions. A test sequence is created by assembling a set of interface components associated with an interface window. One of the interface components is randomly selected, and a random action is generated to apply to the interface component. The test sequence is documented by recording data that identifies the interface component and the action, and the action is then applied to the user interface.

13 Claims, 4 Drawing Sheets

METHOD AND APPARATUS FOR TESTING SOFTWARE HAVING A USER INTERFACE

FIELD OF THE INVENTION

The present invention generally relates to testing software, and more particularly to testing software having a user interface.

BACKGROUND

The development of software has traditionally followed a development process including stating requirements, formulating the requirements into formal specifications, designing software consistent with the specifications, and coding the design. Depending upon the intended application of the software and the available resources, including time, various verification steps are performed throughout the development cycle to ensure proper operation. For example, at the design stage, various design reviews are conducted to determine whether the proposed design will achieve the specified objectives. If not, the system design is modified or the specifications are rewritten. At the coding stage, program proofs and walk-throughs are sometimes used to identify program bugs. After the system is programmed, various tests are run against the software to verify some level of system operability.

The pressure to quickly bring products to market has presented new challenges for software makers. Not only must design and coding be accomplished in less time, but verification and testing must also be accomplished more quickly. New design tools and programming languages have helped in the design and coding aspects. However, software verification tools have been slower in developing.

As we become more and more reliant on software, error-free or near error-free software becomes increasingly important. However, with less time to verify correct operation of software system, software testing may receive less emphasis even though testing has not diminished in importance.

A method and apparatus that addresses the aforementioned problems, as well as other related problems, is therefore desirable.

SUMMARY OF THE INVENTION

In accordance with various embodiments of the invention, software having a user interface is tested by automatically evolving user inputs. The method generally entails evolving a test sequence by generating random test actions. A test sequence is created by assembling a set of interface components associated with an interface window. One of the interface components is randomly selected, and a random action is generated to apply to the interface component. The test sequence is documented by recording data that identifies the interface component and the action, and the action is then applied to the user interface.

In another embodiment, a test sequence is further evolved by repeating the actions of a test sequence in a previously created log file. Some of the entries are randomly discarded, and a new log file is created that includes the entries from the old log file without the discarded entries.

In yet another embodiment, a test sequence is further evolved by repeating the actions of a test sequence in a previously created log file and randomly discarding and randomly adding new actions in creating new test sequence.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is believed to be applicable to a variety of software systems having various styles of user interfaces and has been found to be particularly useful for the graphical user interfaces that are presently popular. It will be appreciated that the embodiments described herein could be readily adapted to software having other types of user interfaces, for example, biometric controls.

Figure 1:
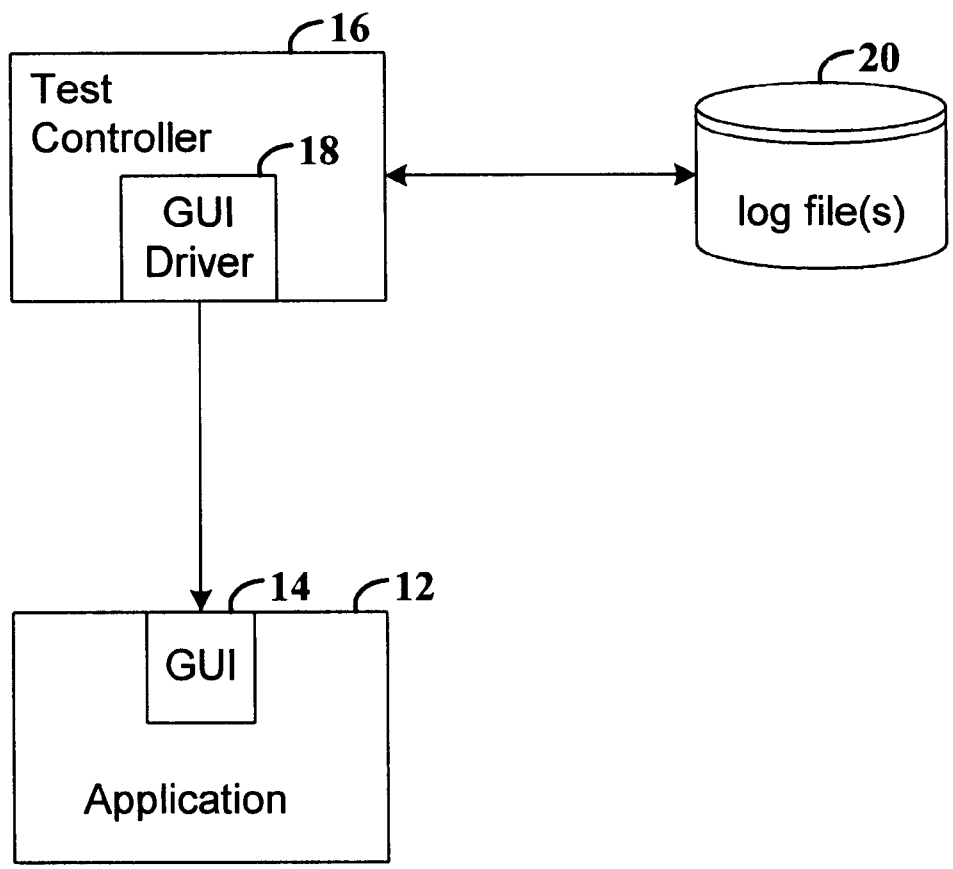
FIG. 1 is a block diagram of an example system for testing an application having a graphical user interface.

FIG. 1 is a block diagram of an example system for testing an application having a graphical user interface. While not shown, it will be appreciated that application 12 and test controller 16 are hosted by one or more suitable data processing systems. Application 12 is a software program to be tested which includes a graphical user interface (GUI) 14. Example applications include database application and electronic design tools.

Test controller 16 implements one or more of the processes described in the following figures and includes GUI driver 18. GUI driver 18, which is coupled to GUI 14, is the interface between the processes of the test controller and the GUI. Software such as JavaStar has functions that are suitable for GUI driver 18. Test controller 16 is operable in various modes, each mode having a variation on randomly evolving a test sequence. In one mode, a user interface component, for example, a pull-down menu, is randomly selected and an input action is randomly generated. The actions are saved as a log file 20 for future reference and applied to the GUI. If and when the application becomes non-responsive, it is known that a software error has been detected, and the log file is saved for future reference.

In another mode, test controller 16 takes as input a previously generated log file, and attempts to reduce the number of actions required to replicate an error or produce a new error. This mode involves applying actions as specified in the input log file and randomly skipping some of the actions. A new log file is created to document the actions applied to the GUI.

In the final mode, test controller 16 takes as input a previously generated log file where no error was detected and attempts to evolve the test sequence to cover more logic embodied in application 12. Test controller 16 randomly discards actions from the input log file, applies some actions from the input log file, and randomly creates new actions in evolving the test sequence. The combination of selected actions from the log file and new actions are recorded in a new log file.

Figure 2:
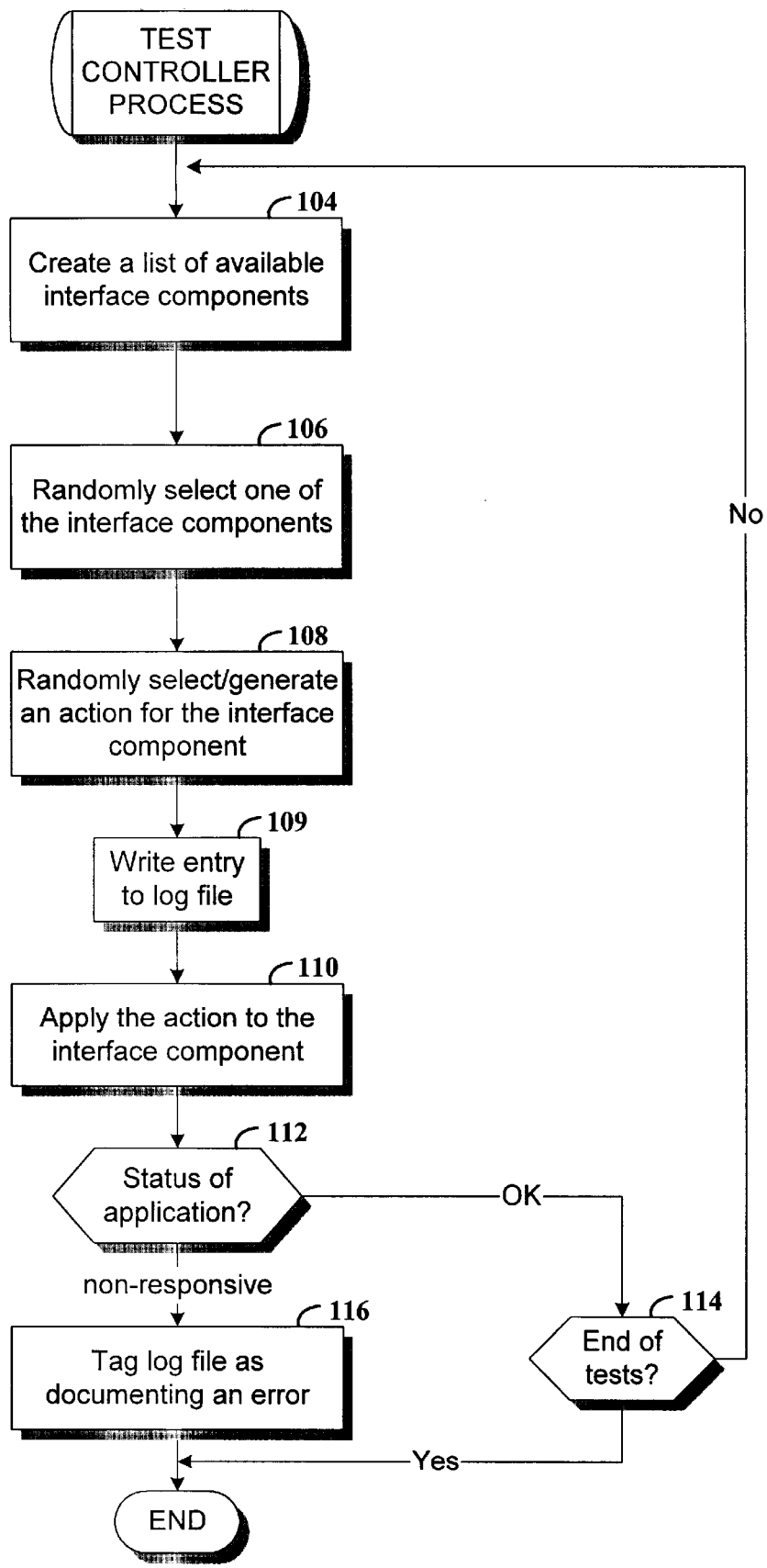
FIG. 2 is a flowchart of a process for creating and performing a sequence of test actions in accordance with one embodiment of the invention.

FIG. 2 is a flowchart of a process for creating and performing a sequence of test actions in accordance with one embodiment of the invention. The process of FIG. 2 implements the first mode of evolving a test sequence in which test actions are randomly generated based on the available user interface components.

At step 104, a list of the available interface components is created by test controller 16 via GUI driver 18. The available interface components are those available for user manipulation in a window. In the context of an example GUI, the possible interface components include, for example, radio buttons, check boxes, pull-down lists, scroll bars, text-entry boxes, tabs, spinners, window control buttons (minimize, maximize, close window, and shrink window), menus, tool-bar buttons, and sliders. Those skilled in the art will recognize GUI interface components in addition to those listed above.

At step 106, one of the interface components is randomly selected from the assembled list. The random selection can be accomplished using, for example, functions provided by the language in which test controller 16 is implemented. In one embodiment, test controller 16 is implemented in Java.

Based on the selected interface component, step 108 randomly selects or generates an action to apply to the interface component. For example, a random one of the items in a pull-down menu is selected, or random text is generated for a text entry box. In addition, the random actions may include various sequences of mouse clicks on different ones of the interface objects.

At step 109 an entry is written to the log file to record the action applied to the interface component. The log file documents a time-ordered sequence of actions applied to the interface components. In one embodiment, the log-file can be implemented as a sequential time-ordered file. In another embodiment, the log file could be implemented as a time-keyed database. Each entry in the log file includes, for example, the name of the interface component, a location description, the type of the component, the type of the action, the action, and the time at which the action was applied.

The action is then applied to the interface component at step 110. Decision step 112 tests the status of the application program. If the program responds to the input, for example, by providing a new or updated user interface window, processing proceeds to decision step 114. If according to test requirements, testing is to continue, processing is returned to step 104. In one embodiment, the criteria for stopping the process is defining a maximum number of test actions to perform. In another embodiment, a maximum time period could be specified in which the tests are to run. The time period could range from a short time, for example, one second, to an extended period of time, for example, a number of days. Other criteria, such as a dialog box having the message, "Application Complete", or the application reaching a memory usage limit may also signal the end of a test. Suitable criteria for ending the test are application dependent. At step 104, a new list of available interface components is assembled based on the new window generated by the application.

If the application becomes non-responsive, control is directed to step 116 where the log file is tagged as documenting an error. The tag may be used later for purposes of trying to replicate the error and debug the application. In addition, selected error codes can be written to the log file following the last action applied. The application may be observed as being non-responsive where the application has aborted operations or is stuck in an unknown state. In either instance, the GUI driver can detect that the application is non-responsive via its interface with the GUI of the application.

Figure 3:
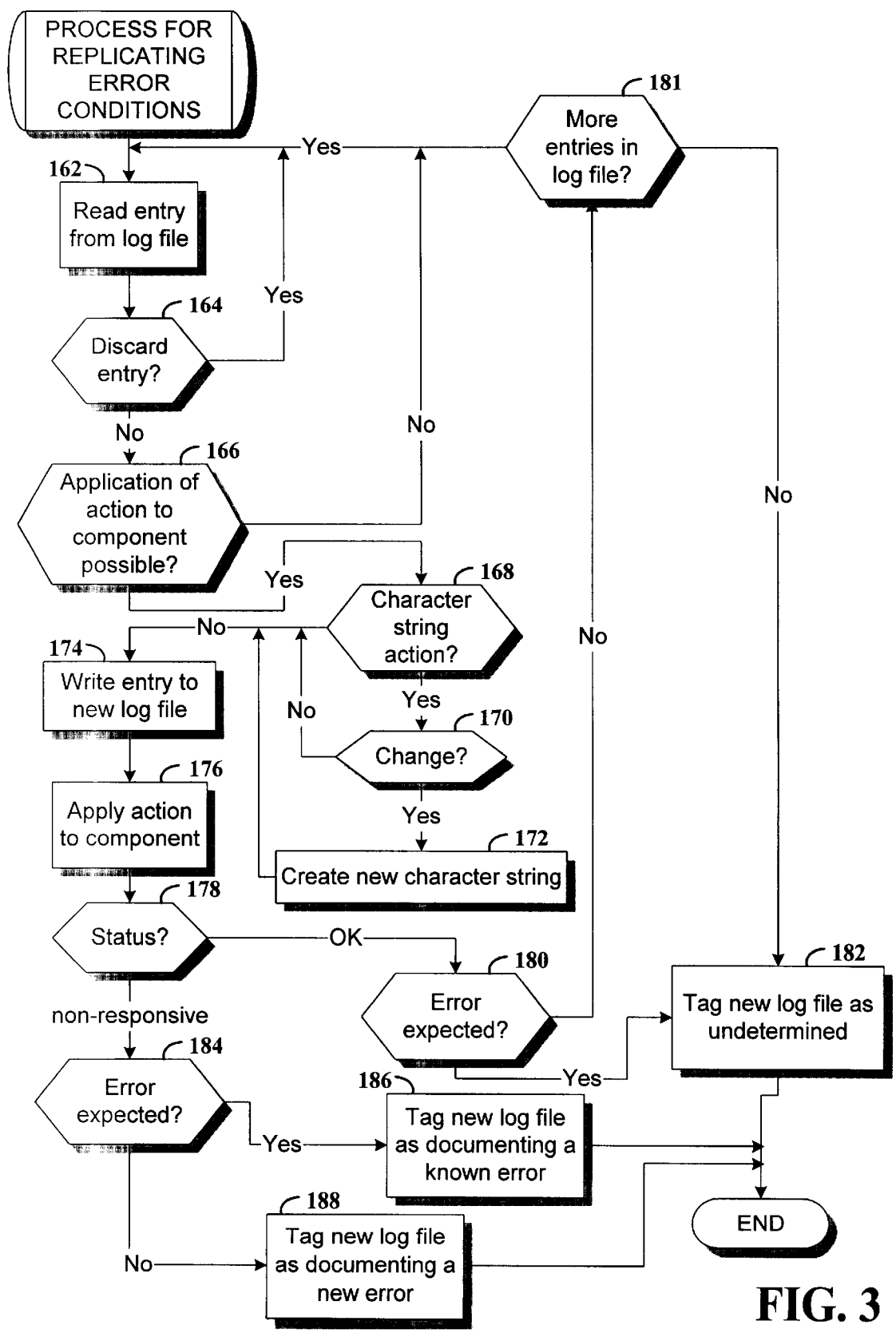
FIG. 3 is a flowchart of a process for evolving a test sequence in attempt to replicate an error condition.

FIG. 3 is a flowchart of a process for evolving a test sequence in attempt to replicate an error condition. The process generally entails using test actions from a previously generated log file and randomly discarding some of the test actions. A new log file is created to document the evolved test sequence.

At step 162, an entry is read from the previously created log file. Recall that the log file entry includes the data that identifies the interface component and the action applied to the component. Decision step 164 determines, at random, whether this entry should be discarded. In one embodiment, every one in ten entries may be discarded. In another embodiment, different probabilities are assigned to the various types and specific instances of interface components, and the probabilities are used in determining whether the entry should be discarded. For example, particular actions are assigned respective probabilities (values between 0 and 1). After reading an entry from the log file, a random number between 0 and 1 is generated. If the random number is less than the probability associated with the action specified by the entry in process, the entry is discarded. If the entry is discarded, control is returned to step 162 to read the next entry from the log file. Otherwise, processing proceeds to step 166.

Decision step 166 tests whether the present action is possible give the current state of the GUI. This test is necessary since some of the actions are being discarded. specifically, the ability to apply the present action may depend upon the application of the preceding step. If the preceding step was discarded, the interface component referenced in the present action may not be present. If the present action is not possible, processing returns to step 162 to get the next entry from the log file. Otherwise, processing continues at decision step 168.

Decision step 168 test whether the action is entry of a character string. If so, decision step 170 determines whether the character string should be changed or the old character string should be used. If, for example, the character string is associated with referencing a particular file, it may be desirable to leave the character string as is. In other application dependent situations it may be desirable to use a different character string. At step 172, a new random character string is generated, and processing then continues at step 174.

An entry is written to a new log file at step 174 based on the interface component read from the old log file and the associated action. At step 176, the action is applied to the interface component, and decision step 178 tests the status of the application.

If the application is responsive to the GUI driver, processing proceeds to decision step 180, which tests whether an error condition was expected. Whether an error was expected after the present action can be determined by reading the log file to determine whether any error codes were logged after the action. If no error was expected, processing proceeds to decision step 181, which determines whether there are more entries in the log file. Processing returns to step 162 if there are more entries or proceeds to step 182 if there are no more log entries to process. At step 182, the log file is tagged as being undetermined, that is, an error was not generated from the sequence documented in the new log file.

If the application is non-responsive, processing continues at decision step 184, which tests whether an error was expected. If an error was expected, at step 186 the new log file is tagged as documenting a known error and processing is complete. Otherwise, decision step 184 directs processing to step 188, where the new log file is tagged as documenting a new error.

It will be appreciated that the process of FIG. 3 could be repeatedly applied to an initial log file in order to create a population of new log files. Since entries from the initial log file are randomly discarded, each new log file may be different from the others. The process may be repeated a selected number of iterations or for a selected period of time, for example. Other stopping criteria will be apparent to those skilled in the art.

Figure 4:
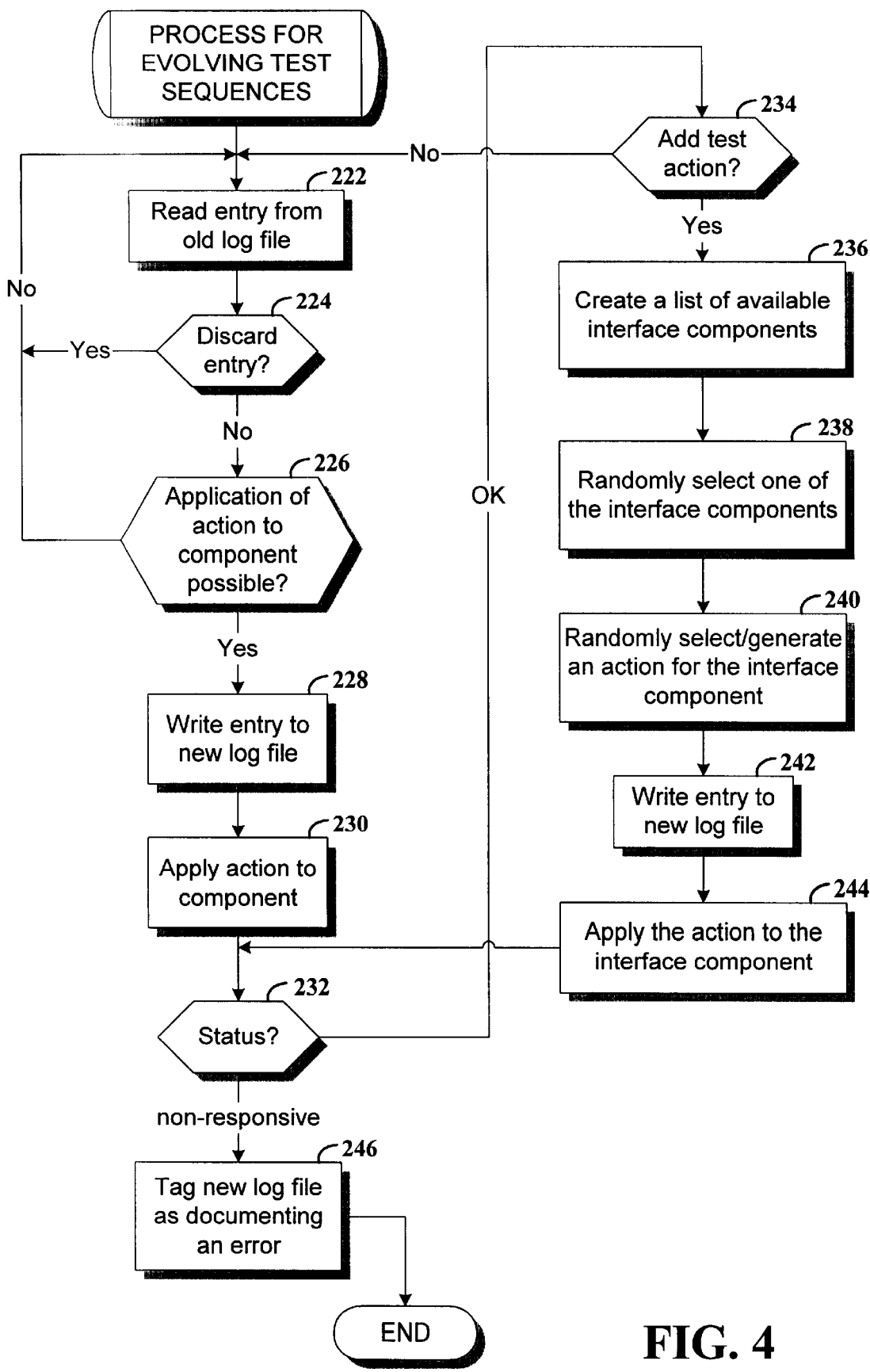
FIG. 4 is a flowchart of a process for evolving a test sequence.

FIG. 4 is a flowchart of a process for evolving a test sequence. It may be desirable to evolve a test sequence in order to increase the application program code that is exercised by the tests, for example. It will be appreciated that test sequences may be evolved to suit other purposes, such as reducing the time required to execute a test sequence or other application specific purposes. The process generally entails reading a test sequence from a previously generated log file in which no error was produced and mutating the test sequence to exercise more of the program code.

At step 222, an entry is read from the log file, and decision step 224 determines whether the entry should be discarded. The process discards random ones of the entries as described above and processing continues at step 222 to get the next entry from the log file. When an action is not discarded, processing continues at decision step 226 to determine whether it is possible to apply the action to the specified component. As explained above in association with the process of FIG. 3, discarding an entry from the log file may make applying the action of the following entry impossible.

Processing continues at step 228 when a valid entry is found. Step 228 writes an entry in the new log file to document corresponding to the entry read from the old log file. At step 230, the action is applied to the specified component, and the program status is tested at decision step 232.

If the program is responsive, processing proceeds to decision step 234 to determine whether a new test action should be added to the test sequence. In one embodiment, whether a new action is created to add to the test sequence is a random event. That is, a probability factor is associated with creating a new action, and each time decision step 234 is performed, the probability factor is used in conjunction with a language provided random number generator.

If no test is to be created, processing proceeds to step 222 to read the next entry from the old log file. Otherwise, processing continues at step 236 where a list of interface components is created. Steps 236, 238, 240, 242, and 244 (which correspond to steps 104, 106, 108, 109, and 110 of FIG. 2, respectively) create a new random action for a random interface component and apply the action accordingly. A new entry for the action is written to the new log file to document the new action in the test sequence. Processing then continues at decision step 232 to determine the result of applying the new action.

In other embodiments, a population of log files is created and each member of the population may be evolved according to the processes of FIGS. 3 and 4. After evolving each of the individual members of the population, the population of log files is evolved into another generation. Selected ones of the log files are marked to survive into a subsequent generation of log files, and others of the log files are discarded. The population may be evolved by dividing each of the log files into two or more pieces and recombining the pieces to form new log files. The new log files are then subjected to the processes of FIGS. 3 and 4, as appropriate. The process of evolving a population of log files may be repeated for as many generations as may be desirable to satisfy application specific testing requirements. The performance of a log file (to determine whether the log file will survive to the next generation) can include various combinations of factors such as branch coverage (relative to application program code), distribution of "case" statement switches, distribution of nested logical conditions evaluating to true and false, distribution of the number of loop iteration, frequency with which boundary conditions have been tested, frequency of routine execution, frequency of entering call sites, and frequency of multiple threads executing in routines.

The methods described herein can be used to test GUI software that is deployed on a variety of hardware platforms to ensure consistency of operation across platforms. Thus, the input data sequence(s) are recorded while testing a GUI on a first platform. To test the GUI on another platform, the input data sequence(s) recorded for the first platform is used instead of randomly generating additional input data sequence(s).

The present invention is believed to be applicable to a variety of processes for testing software and has been found to be particularly applicable and beneficial in testing software having a graphical user interface. While the present invention is not so limited, an appreciation of the present invention has been provided by way of specific examples involving a graphical user interface. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for testing software having a user interface, comprising:

assembling a set of interface components associated with an interface window;

randomly selecting one of the interface components;

generating a random action associated with the one interface component;

applying the action to the user interface;

recording data identifying the interface component and the action, wherein the recording of data comprises writing the data to a first log file; and repeating the steps of assembling, selecting, generating, applying, and recording until a predetermined event occurs, the method further comprising:
  (a) reading an entry from the first log file, the entry including data that identifies an interface component and action;
  (b) randomly determining whether to discard the entry;
  (c) if the entry is discarded repeating the steps of reading and determining; and
  (d) if the entry is not discarded, writing the entry to a second log file and applying the action to the interface component.

2. The method of claim 1, wherein the predetermined event is non-responsiveness of the software.

3. The method of claim 1, wherein the predetermined event is a selected number of iterations.

4. The method of claim 1, wherein the predetermined event is passage of a selected period of time.

5. The method of claim 1, wherein the predetermined event is usage by the software of an amount of computer memory that exceeds a selected level.

6. The method of claim 1, further comprising (e) repeating the steps of claim 1 until all entries of the first log file have been processed.

7. The method of claim 6, further comprising, (f) if application of the action to the interface component results in the software being non-responsive and the software was expected to be non-responsive, tagging the second log file as documenting a known error and ceasing to process the first log file.

8. The method of claim 7, further comprising reprocessing the first log file according to the steps (a)–(f) and (g) repeating the reprocessing of the first log file until a selected event occurs, wherein a new log file is created with each repetition.

9. The method of claim 8, further comprising, (h) if application of the action to the interface component results in the software being non-responsive and the software was not expected to be non-responsive, tagging the second log file as documenting a new error and ceasing to process the first log file.

10. The method of claim 6, further comprising, (i) if application of the action to the interface component results in the software being responsive and the software was expected to be non-responsive, tagging the second log file having an undetermined test sequence and ceasing to process the first log file.

11. The method of claim 10, further comprising reprocessing the first log file according to the steps (a)–(e) and (i) and repeating the reprocessing of the first log file until a selected event occurs, wherein a new log file is created with each repetition.

12. The method of claim 1, further comprising if application of the action to the interface component results in the software being non-responsive, tagging the second log file as documenting a known error and ceasing to process the first log file;

if application of the action to the interface component results in the software being responsive, randomly determining whether to create a new test action;

if a new test action is to be created, then assembling a set of interface components associated with a current interface window, randomly selecting one of the interface components, generating a random action associated with the one interface component, applying the action to the user interface, and recording data identifying the interface component and the action in the second log file.

13. An apparatus for testing software having a user interface, comprising:

means for assembling a set of interface components associated with an interface window;

means for randomly selecting one of the interface components;

means for generating a random action associated with the one interface component;

means for applying the action to the user interface;

means for recording data identifying the interface component and the action, wherein the data is recorded to a first log file;

means for reading an entry from the first log file, the entry including data that identifies an interface component and action;

means for randomly determining whether to discard the entry;

means for if the entry is discarded repeating the steps of reading and determining; and means for writing the entry to a second log file and applying the action to the interface component if the entry is not discarded.

* * * * *